United States Patent [19]
Patel et al.

[11] Patent Number: 6,089,106
[45] Date of Patent: Jul. 18, 2000

[54] FORCE SENSOR ASSEMBLY

[75] Inventors: Vihang C. Patel; Torbjorn Thuen, both of Lakeland, Fla.; Jouni K. Hänninen; Heikki T. Kuisma, both of Helsinki, Finland

[73] Assignee: Breed Automotive Technology, Inc., Lakeland, Fla.

[21] Appl. No.: 09/148,232

[22] Filed: Sep. 4, 1998

[51] Int. Cl.[7] .............................. G01L 1/02; B60R 21/32; G08B 21/00
[52] U.S. Cl. ...................... 73/862.582; 73/715; 280/735; 340/667
[58] Field of Search ............................... 73/715, 720, 721, 73/726, 727, 862.582; 280/735, 732, 727; 340/667, 665, 666

[56] References Cited

U.S. PATENT DOCUMENTS

| | | | |
|---|---|---|---|
| 2,488,347 | 11/1949 | Thurston . | |
| 3,439,541 | 4/1969 | Gilder . | |
| 4,609,966 | 9/1986 | Kuisma | 361/283 |
| 5,048,531 | 9/1991 | Spotts et al. | 128/675 |
| 5,209,121 | 5/1993 | Häfner | 73/727 |
| 5,218,972 | 6/1993 | Gorsuch et al. | 128/775 |
| 5,232,243 | 8/1993 | Blackburn et al. | 280/735 |
| 5,296,659 | 3/1994 | Potts et al. | 73/861.47 |
| 5,392,653 | 2/1995 | Zanger et al. | 73/756 |
| 5,438,877 | 8/1995 | Vowles et al. | 73/756 |
| 5,454,270 | 10/1995 | Brown et al. | 73/720 |
| 5,522,267 | 6/1996 | Lewis | 73/726 |
| 5,525,843 | 6/1996 | Höwing | 280/727 |
| 5,624,132 | 4/1997 | Blackburn et al. | 280/735 |
| 5,661,245 | 8/1997 | Svoboda et al. | 73/726 |
| 5,739,757 | 4/1998 | Gioutsos | 280/735 |
| 5,748,473 | 5/1998 | Breed et al. | 280/735 |
| 5,753,819 | 5/1998 | Rozgo et al. | 73/706 |
| 5,810,392 | 9/1998 | Gagnon . | |
| 5,971,432 | 10/1999 | Gagnon et al. . | |

FOREIGN PATENT DOCUMENTS

| | | |
|---|---|---|
| 0677727 | of 1995 | European Pat. Off. . |
| 759876 | 8/1980 | U.S.S.R. . |
| 9835861 | of 1998 | WIPO . |

*Primary Examiner*—Harshad Patel
*Attorney, Agent, or Firm*—Lonnie Drayer; Patrick Stiennon

[57] ABSTRACT

Several force sensor assemblies are disposed within a vehicle seat to determine seat loading and assist in safety device activation. Each force sensor assembly has a sealed body filled with a liquid or a gel. A pressure transducer, together with a supporting integrated circuit, is positioned to respond to the pressure of the liquid or gel. Loads are applied to the pressure transducer through the gel by a piston riding within the body. Compressive loads are thereby transformed into a pressure on the sensor and its support electronics, resulting in a low cost, accurate, and durable sensor. The sensor functions well for relatively low loads of less than a few hundred pounds.

24 Claims, 4 Drawing Sheets

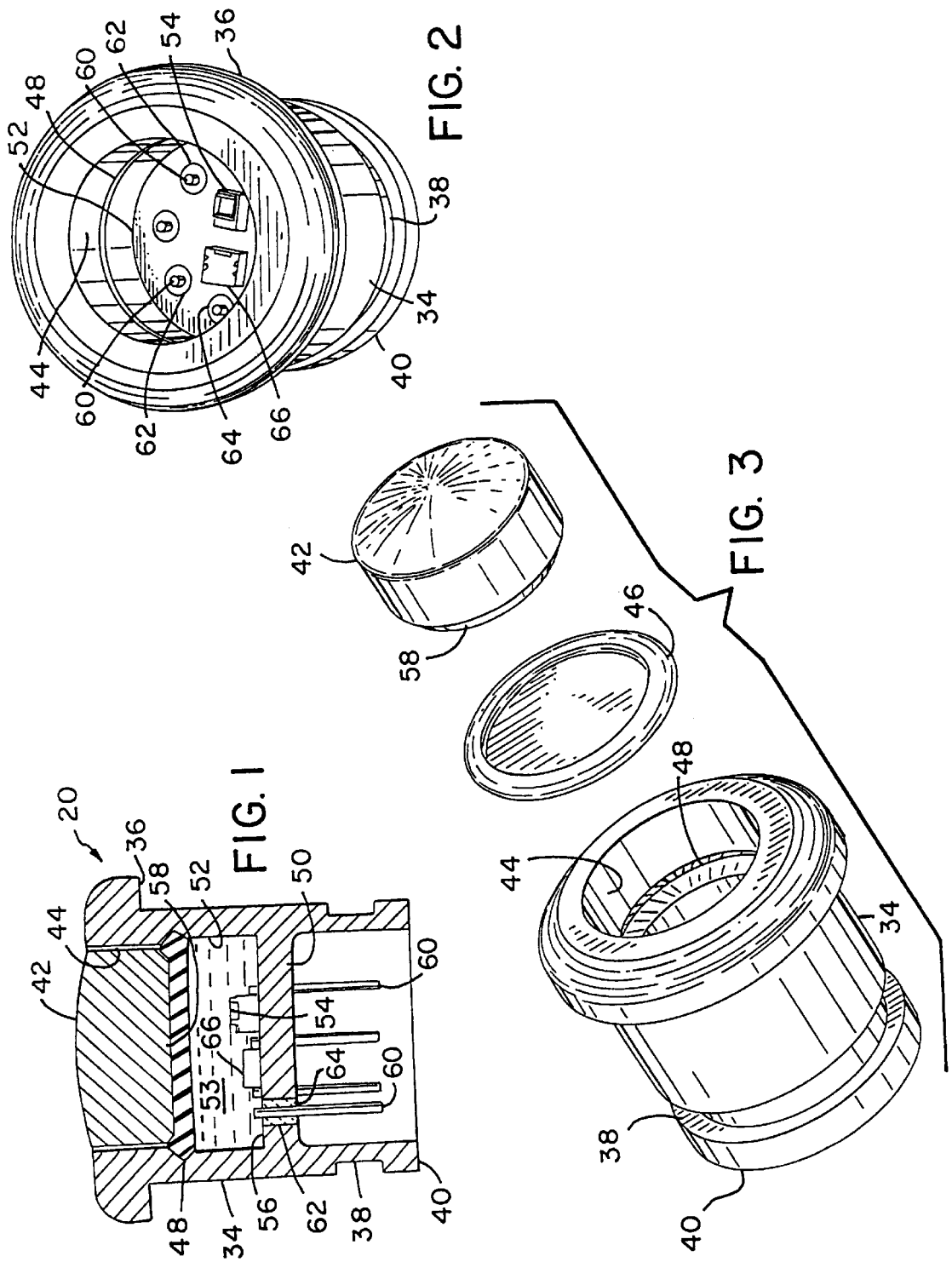

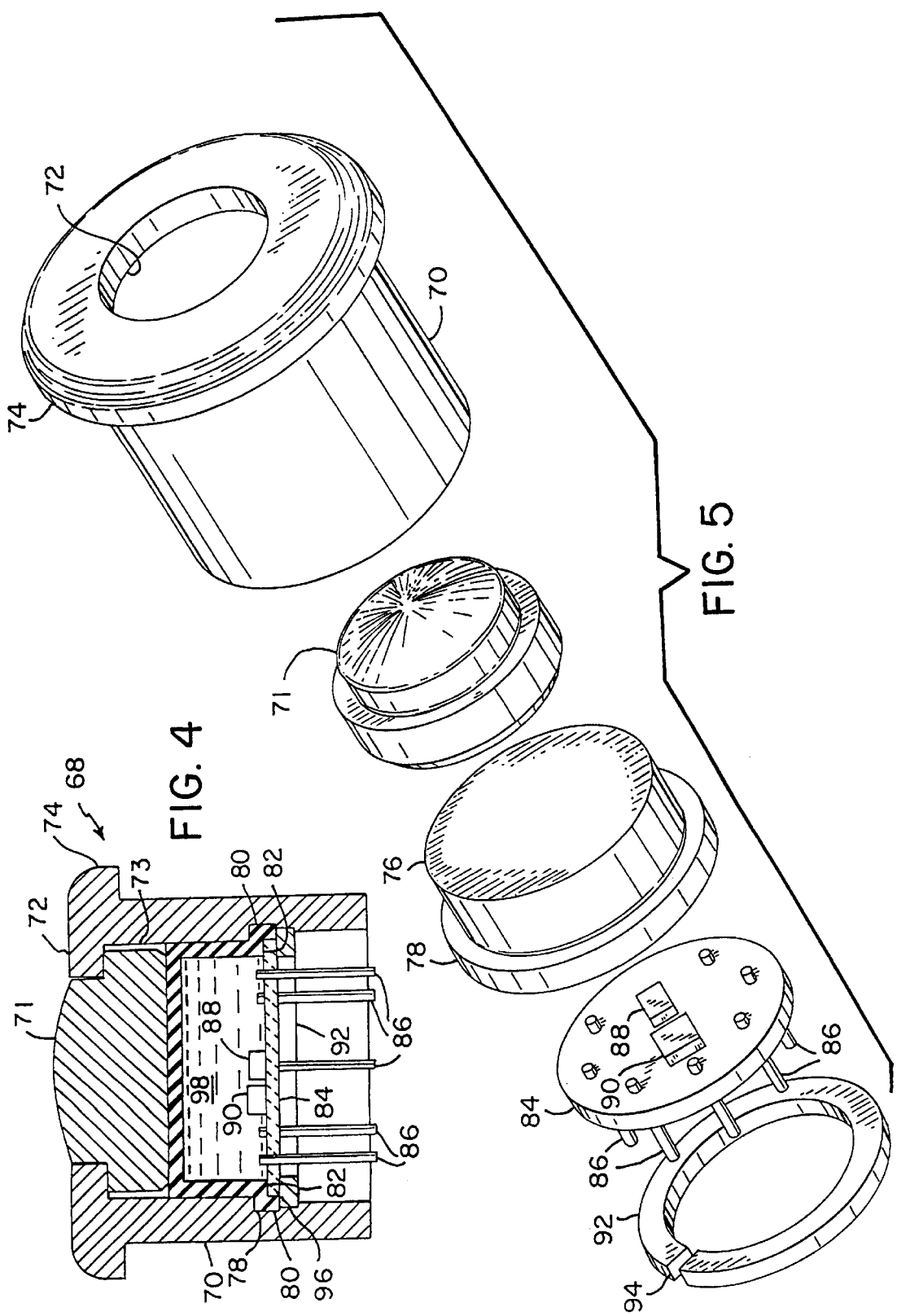

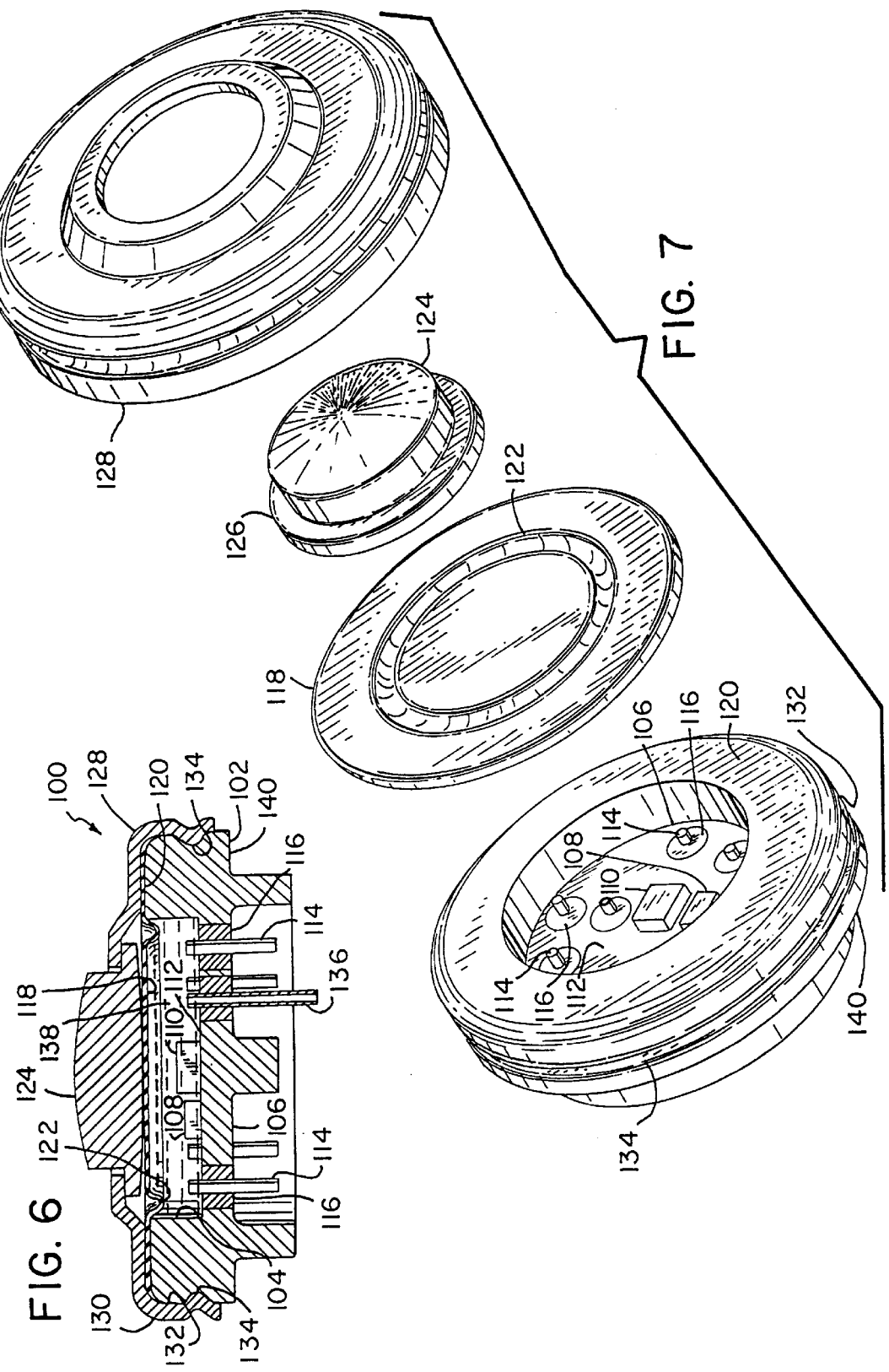

FORCE SENSOR ASSEMBLY

FIELD OF THE INVENTION

The present invention relates to force sensor assemblies and pressure transducers in general and to sensors used in determining the weight of a seat occupant in an automobile in particular.

BACKGROUND OF THE INVENTION

Determining the weight of a passenger or driver of a motor vehicle allows the weight of the occupant of a particular seat within a motor vehicle to be used as one variable by an airbag logic system which decides whether and how to deploy an airbag. One approach to determining the weight of a car seat occupant is to place force sensor assemblies in the load path between the seat cushion and the seat frame or other seat structure. Force sensor assemblies employing piezoelectric sensors or strain gauges are well known. However, a load sensor for use in an automobile has unique requirements. First, the loads to be measured are relatively low compared to typical force sensor assembly configurations. Second, the sensors must operate over a long period of time, as long as ten years or more, without adjustment or maintenance. The sensors must be low cost, yet must achieve high reliability and reasonable sensitivity.

Micro machined pressure sensors based on silicon are known and can readily be integrated with circuitry to monitor and calibrate a pressure sensor. Such silicon based sensors can have the necessary low cost and self-calibration and testing necessary to work over the long term and in the environmental extremes to which the interior of automobiles are subjected. Nevertheless, integrating such a sensor into a package which can be placed in the load path of a car seat and which can be used to measure occupant weight presents a difficult problem.

What is needed is a force sensor assembly for measuring the weight of an automobile occupant which is low cost, durable, and capable of self-test and calibration.

SUMMARY OF THE INVENTION

The force sensor assembly of this invention employs a sealed container having an internal volume which is filled with a liquid or a gel. Within the sealed container a micro mechanical pressure transducer together with a supporting integrated circuit is positioned so that the pressure transducer responds to the pressure of the liquid or gel. A piston or plunger is supported by the liquid or gel. The piston is the means by which load is applied to the cell. By this arrangement a compressive load is transformed into a pressure on the sensor and its support electronics which are submerged within the load supporting liquid or gel, resulting in a low cost, accurate, and durable sensor. The sensor functions well for the relatively low loads of less than a few hundred pounds. The force sensor assembly is particularly useful in constructing a vehicle seat which capable of determining the weight of a person occupying the seat. Seat occupant weight is an important variable in optimizing the deployment of safety equipment within the vehicle in the case of a crash.

It is an object of the present invention to provide a force sensor assembly for accurately measuring compressive loads.

It is a further object of the present invention to provide a force sensor assembly packaging a micro mechanical sensor in a way suitable for use in a motor vehicle.

It is another object of the present invention to provide a force sensor assembly readily adapted to different load requirements.

It is a yet further object of the present invention to provide a force sensor assembly for use in determining the weight of a vehicle seat occupant which incorporates ancillary circuitry within the sensor body to improve data reliability and minimize sensor noise.

Further objects, features and advantages of the invention will be apparent from the following detailed description when taken in conjunction with the accompanying drawings.

BRIEF DESCRIPTION OF THE DRAWINGS

FIG. 1 is a cross-sectional view of the force sensor assembly of this invention.

FIG. 2 is a perspective view of the force sensor assembly of FIG. 1.

FIG. 3 is an exploded isometric view of the force sensor assembly of FIG. 1.

FIG. 4 is a cross-sectional view of an alternative embodiment force sensor assembly of this invention.

FIG. 5 is an exploded isometric view of the force sensor assembly of FIG. 4

FIG. 6 is a cross-sectional view of a further embodiment force sensor assembly of FIG. 1.

FIG. 7 is an exploded isometric view of the force sensor assembly of FIG. 6.

DETAILED DESCRIPTION OF THE INVENTION

Figure 8:
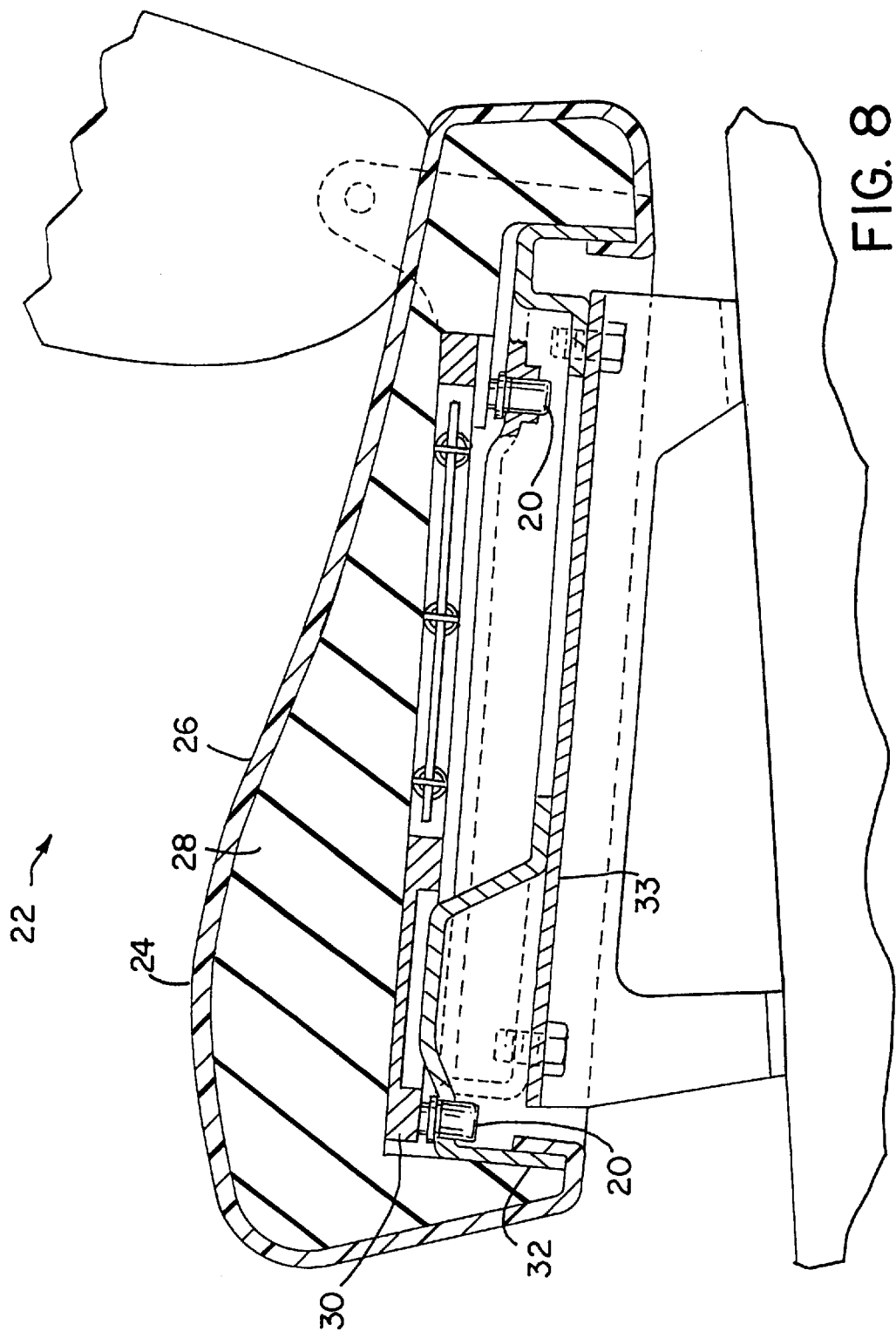
FIG. 8 is a cross-sectional view of a vehicle seat utilizing the force sensor assembly of FIG. 1 to measure the weight of an occupant.

Referring more particularly to FIGS. 1–8 wherein like numbers refer to similar parts, a force sensor assembly 20 is shown in FIG. 1. As shown in FIG. 8, the force sensor assembly 20 is installed in a vehicle seat 22. The seat has a cushion 24 with a cover 26 which extends over an inner foam cushion 28 supported on a spring bed 30. The spring bed is mounted so it is supported on a seat pan 32 by four force sensor assemblies 20. The seat pan 32 is bolted to a seat frame 33 that may be assembled with a vehicle (not shown). Substantially all the load produced by the weight of an occupant on the seat cushion 24 is transmitted to the seat pan 32 through the four force sensor assemblies 20 as is disclosed more fully in U.S. Pat. No. 5,810,392, which is incorporated herein by reference.

As shown in FIGS. 1–3, the force sensor assembly 20 has a metal body 34 with a flange 36 used in assembling the force sensor assembly to a seat pan. A circumferential groove 38 near the base 40 of the force sensor assembly body provides for a mating connector which engages the circumferential groove 38 so as to retain and secure the force sensor assembly. A metal plunger 42 is positioned within a cavity 44 formed within the body 34 inwardly of the flange 36. The metal plunger 42 is bonded to a deformable elastomeric seal 46, preferably rubber, which acts as a diaphragm extending across the cavity 44. The elastomeric seal which functions as a diaphragm is fixed in place with respect to the body 34 by a peripheral portion of the elastomeric seal filling a circumferential groove 48 formed on the inside of the cavity 44. A portion of the body 34 forms a disk 50 extending across the cylindrical cavity 44. A reservoir 52 is formed between the disk 50 and the rubber seal 46. The reservoir is filled with a silicone gel 53 which functions similar to a liquid inasmuch as the gel 53 transmits pressure but not shear forces and is essentially incompressible. The deformable elastomeric seal prevents leakage of gel and the direct contact of gel and the plunger.

A micro machined pressure sensor 54, of the general type disclosed in U.S. Pat. No. 4,609,966, which is incorporated herein by reference, is mounted to the upper surface 56 of the disk 50. Micro machined pressure transducers employ the techniques developed for mass production of integrated circuits to fabricate micro sensors. These techniques allow the repeatable manufacture of highly precise sensors. In addition, it is possible and sometimes desirable to fabricate some electronic devices on the substrate on which the micro sensor is formed. The co-fabricated electronics can amplify or process the output of the sensor. Forming a pressure transducer by a capacitor created between a flexible membrane and a vacuum cavity, as suggested in U.S. Pat. No. 4,609,966, has been found to be an effective approach to measuring pressure.

If, by way of example, the maximum load for a single load transducer 20 is two hundred pounds, and if the plunger 42 has a base area 58 of one hundred square millimeters, the pressure in the gel 53 will be two pounds per millimeter squared or about 1,300 pounds per inch squared or about 9 MPa. Typical micro transducers have areas of from about 0.01 to about one millimeter square and thus the force sensor assembly 20 converts a 200 pound load to a load of two to 0.02 pounds which is actually measured. This is the primary function of the force sensor assembly: to take the large real world load produced by a seat occupant and scale it down to a level where the cost and reliability advantages of integrated circuit technology can be used to measure the load.

As shown in FIG. 1, a plurality of leads 60 extend through holes 62 penetrating the disk 50 around the disk's circumferential edge. A hermetic nonconducting glass seal 64 is formed between the disk and the leads 60. An integrated circuit 66 is also bonded to the upper surface 56 of the disk 50. Gold wire bonding techniques developed for connecting integrated circuits to their circuit packages are used to connect the micro machined pressure sensor 54 with the integrated circuit 66 and to connect the pressure sensor 54 and the integrated circuit 66 to the leads 60. The integrated circuit 66 can perform a number of functions. It converts the capacitance output of the sensing, to a voltage signal and provides the means for adjusting the zero point and scale factor of the sensor. The integrated circuit can compensate for non-linearity of the sensor by providing a fixed or adjustable linearization of the voltage. Control logic and embedded algorithms and temperature compensation can also be implemented by the integrated circuit. The integrated circuit may incorporate an analog-to-digital converter and the digital value may be transmitted by the integrated circuit or the integrated circuit may simply process the data using a look-up table or an algorithm and transmit a word to the safety system controller (not shown). The integrated circuit could also create a go, no-go criteria by opening or closing a circuit. A simple force sensor assembly could be used for a wide range of applications, changing the program of the integrated circuit 66. It will be understood that the integrated circuit 66 may incorporate a microprocessor, an A/D converter, a temperature sensor, EEPROM, ROM and other devices.

The load sensor body 34 is constructed as a screw machine or metal injected molded (MIM) part, typically of stainless steel. The leads are then positioned and the glass fused between the lead and the disk 50. The integrated circuit 66 and the sensor 54 are then bonded to the upper surface 56 of the disk 50. Gold wire bonding is then used to connect the integrated circuit 66 and the sensor 54 to each other and to the leads 60. The silicone gel 53 is then dispensed and cured in place. The rubber seal 46 is formed by dispensing an elastomeric substance and curing it in place or alternatively a preformed diagram can be used instead. Finally, the metal plunger 42 is bonded to the rubber seal 46. A small gap formed between the plunger 42 and the cylindrical cavity 44 allows it to move freely downwardly against the rubber seal 46. The rubber seal is formed of a soft elastomeric material so that it does not support a significant portion of the load which is applied to the plunger 42. The circumferential groove 48 is filled with the rubber forming the seal 46 and thus provides a compete seal of reservoir 52 formed between the disk 50 and the rubber seal 46.

The plunger 42 deflects very little because of the limited capacity of the rubber seal 46 and the silicone gel 53 to compress. This stiffness of the force sensor assembly 20 minimizes the effect of incorporating the force sensor assembly into a vehicle seat in terms of the structural rigidity and feel of the seat.

In an alternative embodiment force sensor assembly 68, shown in FIGS. 4 and 5, a plunger 71 is positively retained within a cavity 73 within the force sensor assembly body 70 by an inwardly projecting lip 72. An outwardly projecting flange 74 engages with the seat pan 32, as shown in FIG. 8.

An elastomeric silicone gasket 76, shaped like a hat, is positioned below the captive plunger 71 and has a peripheral flange 78 (the brim of the hat shaped seal) which fits within a groove 80 in the body 70. The elastomeric silicon gasket functions as a diaphragm interposed between the plunger and the gel and is fixed in place with repect to the body so that it does not free float on the gel. The peripheral flange 78 provides a sealing surface 82 which engages a disk-shaped printed circuit board 84 and alos prevents direct contact of the plunger and the gel. Electrical leads 86 extend through the printed circuit board 84, and are bonded in the conventional manner, typically by solder.

A pressure sensor 88 and an integrated circuit 90 are mounted on the printed circuit board 84. Surface mount technology and circuit traces within the board 84 can be used to connect the integrated circuit 90 and the pressure sensor 88 to the leads 86. Alternatively, gold wire bonding, as described with respect to the force sensor assembly 20 of FIG. 1, may be employed.

The circuit board 84 is held compressed against the sealing surface 82 by a ring 92. The ring 92 has a slot 94 which allows the ring to be compressed and fit into an internal body groove 96 of slightly less diameter then the groove 80 which engages the peripheral flange 78 of the silicone gasket 76. A quantity of silicone gel 98 fills the cavity created between the circuit board 84 and the silicone gasket 76. The functions and capabilities of the force sensor assembly 68 are similar to the force sensor assembly 20. During assembly, the plunger 71 is inserted within the cavity 73, the gasket 76 is positioned against the plunger 71 and filled with gel 98, and the circuit board 84 assembly with sensor 88, integrated circuit 90 and leads 86 are then placed into the cavity and retained by the ring.

Another alternative embodiment force sensor assembly 100 is shown in FIGS. 6 and 7. The force sensor assembly 100 has a rigid body 102, preferably metal, with a central cylindrical cavity 104 which is terminated by an internal metal disk 106. The metal disk 106 is similar to the disk 50 of FIG. 1. A pressure sensor 108 and an integrated circuit 110 are mounted to the upper surface 112 the disk 106. Electrical leads 114 are mounted by nonconducting glass seals 116 similar to those employed in the force sensor assembly 20. The cavity 104 is hermetically sealed by a metal diaphragm 118 which is laser welded to the upper lip surface 120. It is a distinguishing feature of the force sensor assemblies of the present invention that the edge(s) of the diaphragm being fixed in place with respect to the body prevents the diaphragm from free floating on the surface of the gel. The metal diaphragm 118 has a circumferential groove 122 to increase the ability of the diaphragm to freely flex downwardly towards the pressure sensor 108. In cases where the loading of the diaphragm is low a circumferential groove may not be required.

A plunger 124 is positioned over the diaphragm 118 so that a load placed on the plunger 124 is transferred to the diaphragm 118. Inasmuch as the edge(s) of the diaphragm are affixed to the body the plunger of the force sensor assemblies of the present invention is not able to directly contact the gel. The plunger 124 has a flange 126 engaged by a retaining cap 128 which positions the plunger 124 over the diaphragm 118. The retaining cap 128 has a circular hole through which the plunger 124 extends. The retaining cap 128 has a cylindrical sleeve portion 130 which is positioned concentric with and which overlies an outer circumferential surface 132 formed by the body 102. The outer circumferential surface 132 defines a circumferential groove 134 into which the cylindrical sleeve portions 130 of the retaining cap 128 are crimped.

A hollow lead 136 which extends through the disk 106 allows silicone gel 138 to be vacuum backfilled into the cavity formed between the diaphragm 118 and the disk 106. The vacuum backfilling is accomplished by drawing a vacuum on the hollow lead 136 followed by back filling with catalyzed but uncured silicone gel. Once the pressure chamber is filled with bubble free, air free, silicone gel, the fill tube 136 is crimped and soldered. A lip 140 formed on the outside of the body 102 engages the seat pan 32.

It should be understood that the printed circuit board 84 may be of conventional construction or may be constructed of a preformed ceramic substrate.

It should also be understood that typically the integrated circuit is an Application Specific Integrated Circuit (ASIC) which is an integrated circuit design for a particular application.

It will be understood be for the purposes of the claims when the transducer is described as connected to a lead it may be connected directly or indirectly through an additional device such as a integrated circuit which is itself connected to the lead.

It is understood that the invention is not limited to the particular construction and arrangement of parts herein illustrated and described, but embraces such modified forms thereof as come within the scope of the following claims.

What is claimed is:

1. An apparatus for measuring the weight of a seat occupant, the apparatus of the type comprising:
    a seat cushion;
    a seat frame;
    a load support structure positioned between the seat cushion and the seat frame;
    a force sensor assembly mounted in a load transmitting manner within the load support structure; the improvement comprising:
        the force sensor assembly having a body, wherein portions of the body define a cavity within which a pressure transducer is positioned, an integrated circuit connected to the pressure transducer and a quantity of pressure transmitting fluid or gel covering the integrated circuit and pressure transducer within the cavity, a plurality of leads passing through the housing into the cavity wherein each lead is electrically isolated from the housing; and
        a load transmitting member extending upwardly from the force sensor to engage in load supporting relation with the load support structure, the load transmitting member engaged with the fluid or gel so that a fluid pressure develops within the fluid or gel which is proportional to a load supported by the load transmitting member.

2. The apparatus for measuring the weight of a seat occupant of claim 1 further comprising an elastomeric seal positioned between the load transmitting member and the fluid or gel.

3. The apparatus for measuring the weight of a seat occupant of claim 2 wherein the cavity is cylindrical and further comprising portions of the body which define a circumferential groove within the cavity and wherein the elastomeric seal extends into the circumferential groove.

4. The apparatus for measuring the weight of a seat occupant of claim 1 further comprising a metal diaphragm welded to the body and positioned between the load transmitting member and the fluid or gel.

5. The apparatus for measuring the weight of a seat occupant of claim 4 further comprising a retaining cap joined to the body of the force sensor assembly, the retaining cap having portions forming an opening through which the load transmitting member extends.

6. The apparatus for measuring the weight of a seat occupant of claim 1 further comprising an elastomeric hat shaped seal positioned within the cavity and positioned between the load transmitting member and the fluid or gel.

7. The apparatus for measuring the weight of a seat occupant of claim 6 further comprising a printed circuit board on which the transducer and integrated circuit are mounted.

8. The apparatus for measuring the weight of a seat occupant of claim 7 wherein the printed circuit board is retained in place by a ring engaged with the body and locking the printed circuit board against the elastomeric seal.

9. A force sensor assembly comprising:
    a body, the body defining a cylindrical cavity open on a first end;
    portions of the body forming a member which extends across the cylindrical cavity and forms a bottom to the cylindrical cavity, the member having a first side facing the first end;
    portions of the member defining a plurality of holes which extend through the member;
    an electrically conducting lead positioned within each of the plurality of holes, wherein each lead is electrically isolated from and sealed to the member;
    a pressure transducer mounted to the member on the first side, the pressure transducer electrically connected to at least one of said plurality of leads;
    portions of the body defining a circumferential groove spaced from the member;
    an elastomeric member filling the circumferential groove and creating a sealed cavity formed by the body, the member and the elastomeric member;
    a quantity of low shear modulus, substantially incompressible, material filling the sealed cavity; and a load supporting member engaged with the elastomeric member and extending along the cylindrical cavity, wherein a load applied to the load supporting member is transmitted through the elastomeric member and generates a pressure within the substantially incompressible material which can be measured by the pressure sensor.

10. The force sensor assembly of claim 9 wherein the substantially incompressible material is a silicone gel.

11. The force sensor assembly of claim 9 wherein the body is formed of metal and the leads are insulated from the metal body by a quantity of glass which seals the leads to the body.

12. The force sensor assembly of claim 9 further comprising an integrated circuit mounted on the member facing the first end of the cylindrical cavity, the integrated circuit being electrically connected to the pressure transducer.

13. The force sensor assembly of claim 9 wherein the pressure transducer is of a micro machined pressure transducer.

14. The force sensor assembly of claim 9 wherein the body is cylindrical in shape and the cavity extends coaxial with the body and wherein the member is a disk extending across the cylindrical cavity.

15. A method of constructing a force sensor assembly comprising the steps of:
   forming a body having a generally cylindrical shape and having a cylindrical cavity formed therein coaxial with the body, a portion of the body forming a disk which each extends across the cylindrical cavity;
   forming a plurality of holes in the metal disk;
   sealing a metal lead within each hole;
   positioning a pressure sensor on a surface formed by the disk;
   electrically connecting the pressure sensor to at least one of said metal leads;
   placing liquid silicone in the cylindrical cavity;
   catalyzing the silicone to form a gel;
   placing an elastomeric substance on top of the gel and sealing the gel between the elastomeric substance and the disk;
   curing the elastomeric substance to form an elastomeric seal; and
   bonding a load supporting member onto the elastomeric seal.

16. The method of constructing a force sensor assembly of claim 15 wherein the step of forming the body includes the step of forming a circumferential groove spaced from the disk, and the step of placing an elastomeric substance includes filling the circumferential groove with the elastomeric substance so that the elastomeric seal extends into the circumferential groove.

17. A force sensor assembly comprising:
   a body having a generally cylindrical shape, the body defining a coaxial generally cylindrical cavity formed therein, the cavity defining a first radius, the cylindrical shape of the body defining a top and a bottom;
   portions of the body adjacent the top extending radially inwardly to form a portion of the cylindrical cavity with a second radius smaller than the first radius;
   a load transmitting member having a generally cylindrical shape positioned substantially within the cylindrical cavity and having a portion extending through the portions of the body extending radially inward to form the portion of the cylindrical cavity with the second radius;
   an elastomeric hat-shaped seal positioned below the load transmitting member, the hat-shaped seal having a top, a cylindrical side and a brim, the brim opening downwardly and forming a seal with a disk;
   a ring engaged with the body and positioned below the disk, the ring locking the disk against the brim.

18. The force sensor assembly of claim 17 further comprising a pressure transducer positioned on the disk facing the elastomeric hat-shaped seal, and wherein a quantity of fluid or gel fills a space defined between the disk and the elastomeric hat-shaped seal.

19. The force sensor assembly of claim 18 wherein the disk is a printed circuit board and wherein a plurality of leads extend through the printed circuit board and are connected to the pressure transducer.

20. The force sensor assembly of claim 19 further comprising a integrated circuit mounted on the printed circuit board and connected to the pressure transducer and plurality of leads.

21. A force sensor assembly comprising:
   a body, the body defining a cylindrical cavity open on a first end;
   portions of the body forming a member which extends across the cylindrical cavity and forms a bottom to the cylindrical cavity, the member having a side facing the first end;
   portions of the member defining a plurality of holes which extend through the member;
   an electrically conducting lead positioned within each of the plurality of holes, wherein each lead is electrically isolated from and sealed to the member;
   a pressure transducer mounted to the side of the member facing the first end of the cylindrical cavity, the pressure transducer electrically connected to at least one of said plurality of leads;
   portions of the body defining a circumferential groove external to the cylindrical cavity;
   a sealing disk joined to the body and creating a sealed cavity formed by the body, the member and the sealing disk;
   a quantity of low shear modulus, substantially incompressible, material filling the sealed cavity; and
   a load supporting member engaged with the sealing disk and and positioned over the cylindrical cavity;
   a retaining cap overlying the first end having portions defining a cylindrical sleeve, the retaining cap being attached to the body portions of the cylindrical sleeve engaging with the circumferential groove and retaining the load supporting member positioned about the cylindrical cavity; and
   wherein a load applied to the load supporting member is transmitted through the sealing disk and generates a pressure within the substantially incompressible material which can be measured by the pressure sensor.

22. The force sensor assembly of claim 21 wherein the body is formed of metal and the leads are insulated from the metal body by a quantity of glass which seals the leads to the body.

23. The force sensor assembly of claim 22 further comprising an integrated circuit mounted on the member facing the first end of the cylindrical cavity, the integrated circuit being electrically connected to the pressure transducer and plurality of leads.

24. The force sensor assembly of claim 21 wherein the body is formed of metal and the sealing disk is a thin metal diaphragm which is welded to the body.

* * * * *